(12) United States Patent
Lasko

(10) Patent No.: US 8,212,187 B2
(45) Date of Patent: Jul. 3, 2012

(54) HEATER WITH 360° ROTATION OF HEATED AIR STREAM

(75) Inventor: William E. Lasko, Chester Springs, PA (US)

(73) Assignee: Lasko Holdings, Inc., Wilmington, DE (US)

( * ) Notice: Subject to any disclaimer, the term of this patent is extended or adjusted under 35 U.S.C. 154(b) by 875 days.

(21) Appl. No.: 12/266,615

(22) Filed: Nov. 7, 2008

(65) Prior Publication Data

US 2009/0120925 A1    May 14, 2009

Related U.S. Application Data

(60) Provisional application No. 60/986,771, filed on Nov. 9, 2007.

(51) Int. Cl.
*F24C 7/10*    (2006.01)
*F03D 5/06*    (2006.01)

(52) U.S. Cl. .... 219/386; 219/385; 415/53.1; 415/121.2; 415/125; 415/126; 415/127; 416/79; 416/82; 416/98; 416/112; 416/114

(58) Field of Classification Search .................. 219/386; 415/53.1, 121.2, 125–127; 416/79, 82, 98, 416/112, 114

See application file for complete search history.

(56) References Cited

U.S. PATENT DOCUMENTS

| 6,953,322 | B2 | 10/2005 | Lim | |
| 7,217,098 | B2 * | 5/2007 | Lim | 416/100 |
| 7,568,884 | B2 * | 8/2009 | Fok | 415/125 |

* cited by examiner

*Primary Examiner* — Shawntina Fuqua
(74) *Attorney, Agent, or Firm* — Pepper Hamilton LLP

(57) ABSTRACT

A heater with 360° rotation of a heated air stream is provided. The device includes a housing, a motor, an impeller, a heating element, an air stream deflector and a rotational engine. More specifically, the device is directed toward a portable space heater having an outward radial projection of a heated air stream in combination with 360° rotational movement for reducing air temperature stratification and uneven heating problems in a room.

31 Claims, 11 Drawing Sheets

HEATER WITH 360° ROTATION OF HEATED AIR STREAM

CROSS-REFERENCE TO RELATED APPLICATIONS

This application claims priority to U.S. provisional application Ser. No. 60/986,771 filed Nov. 9, 2007, which is incorporated herein by reference in its entirety.

TECHNOLOGY FIELD

The present invention relates to portable space heaters. More specifically, the present invention relates to portable electric space heaters capable of efficiently distributing heat in room.

BACKGROUND

The increasing cost and use of energy is a global concern. One unavoidable process that uses energy is the heating of buildings and more specifically the heating of a single area or room within a building. The ability to efficiently heat a room is a one way of reducing both the usage and therefore the cost of energy.

One manner to heat only a single area is to utilize a conventional space or room heater. These types of conventional heaters often have advantages over heating systems designed for an entire building. Conventional space heaters create heat within a room without the need to heat additional rooms at the same time. Space heaters also eliminate the use of duct work and other permanent structures that are expensive and absorb heat. The heat absorption of duct work etc. contributes to permanent system inefficiencies.

Although conventional space heaters have advantages over other heating systems they still posses several disadvantages as well. For example, conventional convection space heaters require an extended time period to effectively heat an entire room. Therefore the time required to evenly heat a room with a conventional convection space heater does not provide the immediate relief that many users desire.

Many conventional convection space heaters use natural convection to disperse the heated air throughout a room. The heated air naturally rises to the ceiling thereby causing temperature stratification within the room. Such stratification maintains the warmest air in the upper portion of the room; under most normal circumstances the user is located in the lower portion of the room.

Eventually a conventional convection space heater will achieve the desired air temperature at lower levels of the room. The time required to achieve the desired temperature levels at lower levels in the room can vary depending on the size of the room and the heat output from a conventional convection space heaters. At the same time the desired air temperature is achieved at lower levels of the room the air temperature in the upper portion of the room will be excessive. The energy used to generate the excessive heat build up in the upper portion of the room brings the user no relief and as a result is essentially wasted.

A response to the temperature stratification problem common to conventional convection space heaters has been the use of conventional forced air space heaters. Conventional forced air space heaters have appeared in several forms: non-oscillating, oscillation and simultaneous 360° heat output.

Conventional non-oscillating forced air space heaters use a fan to force a heated air stream into a room. This is an effective means to reduce temperature stratification in at least one area of a room. A disadvantage of such conventional non-oscillating forced air space heaters is the generation of hot and cold zones in a room. Although better than conventional convection space heaters, conventional non-oscillating forced air space heaters fail to adequately resolve the problem of uneven heating within a room.

Conventional oscillating forced air space heaters are a further improvement in this area. Conventional oscillating forced air space heaters utilize an oscillating motion to direct the heated air stream over a larger area when compared to non-oscillating forced air space heaters. Commonly the range of oscillation is about 90° of rotation. The use of an oscillation motion does not adequately resolve the problem of uneven heating within a room, it merely increase the size of the hot zone and decrease the size of the cold zone within a room.

Another attempt to overcome the problem of uneven heating within a room are conventional forced air space heaters with simultaneous continuous 360° heat discharge. Expelling heated air around a 360° circumference increases the area of discharge while at the same time lowers the velocity of the heated air stream. The low velocity of the heated air stream fails to penetrate the room, thereby causing the device to act essentially like a conventional convection space heaters.

Simply increasing the volume and velocity of the heated air stream is not a viable option for conventional forced air space heaters with simultaneous 360° heat discharge. One reason is that the increased size of components, such as for example blowers and heating elements will decrease the portability and increases the cost of the device. Another reason that increasing the volume and velocity of the heated air stream is not a viable option is the draft effect induced into the room. As the velocity and volume of air movement increase the draft generated throughout the room will create a cooling sensation in areas not in the initial discharge area of the heated air stream. The cooling sensation generated by draft is not desirable in a portable space heater.

SUMMARY

In view of the deficiencies of the prior art the following description is of a portable space heater with 360° rotation that overcomes several if not all of the prior art deficiencies. The present invention is a portable electric space heater capable of distributing heat efficiently throughout a room.

The portable space heater with 360° rotation reduces air temperature stratification problems that accompany conventional convection space heaters. Unlike conventional convection space heaters the heating effects of the portable space heater with 360° rotation can be experienced immediately by the user.

The portable space heater with 360° rotation reduces the uneven heating of a room and the creation of hot and cold zones that accompany conventional non-oscillating and conventional oscillating forced air space heaters. Homogenized heat distribution is achieved by directing the radially outward flow of the generated hot air stream through 360° rotation.

Unlike a conventional forced air space heater with simultaneous 360° heat discharge the portable space heater with 360° rotation projects a single stream of heated air outward into the room. The outward projection of the heated air stream permits greater penetration of the heated air into the extents of the room. Greater penetration of the heated air stream combined with the 360° rotation provides a rapid and even heating of a room.

The portable space heater with 360° rotation combines an outwardly projected heated air stream and 360° rotation to reduce the heated air volume required to evenly heat the air in a room in minimal time. The size of components, such as for example, the heating element and the blower can be minimized, thereby reducing the overall cost and preserving the portability and space saving characteristics of the device.

In short the portable space heater with 360° rotation has advantages not available in conventional portable space heaters. Such advantages include immediate heating relief for the user, even heat distribution by the reduction of hot and cold zones and the reduction of temperature stratification in a room.

According to one aspect of the invention the portable space heater includes a housing defining an interior space, an air inlet and an air outlet located in a wall of the housing.

According to another aspect of the invention the portable space heater includes a base supporting the housing relative to a support surface and an electric motor disposed within the interior space and an impeller rotated by the electric motor.

According to yet another aspect of the invention the portable space heater includes an air stream deflector disposed within an upper portion of the interior space and a rotational engine attached to the air stream deflector.

According to another aspect of the invention the portable space heater includes a rotation of the air stream deflector about an axis of rotation. The axis of rotation of the air stream deflector being substantially perpendicular to the support surface.

According to another aspect of the invention the portable space heater includes an electric heating element disposed within the interior space between the impeller and the air stream deflector.

According to another aspect of the invention the portable space heater includes a heated air stream exiting the interior space through the air outlet and projected radially outward from the housing along a heated air stream flow path substantially parallel to the support surface.

According to another aspect of the invention the flow path of the heated air stream exiting the interior space moves relative to the base in conjunction with the rotation of the air stream deflector.

According to yet another aspect of the invention the air stream deflector is capable of continuous 360° rotation about the axis of rotation.

According to another aspect of the invention the rotation of the air stream deflector can be reversed at predetermined intervals to achieve an oscillating movement of the flow path of the heated air stream.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures.

DETAILED DESCRIPTION OF ILLUSTRATIVE EMBODIMENTS

Figure 1:
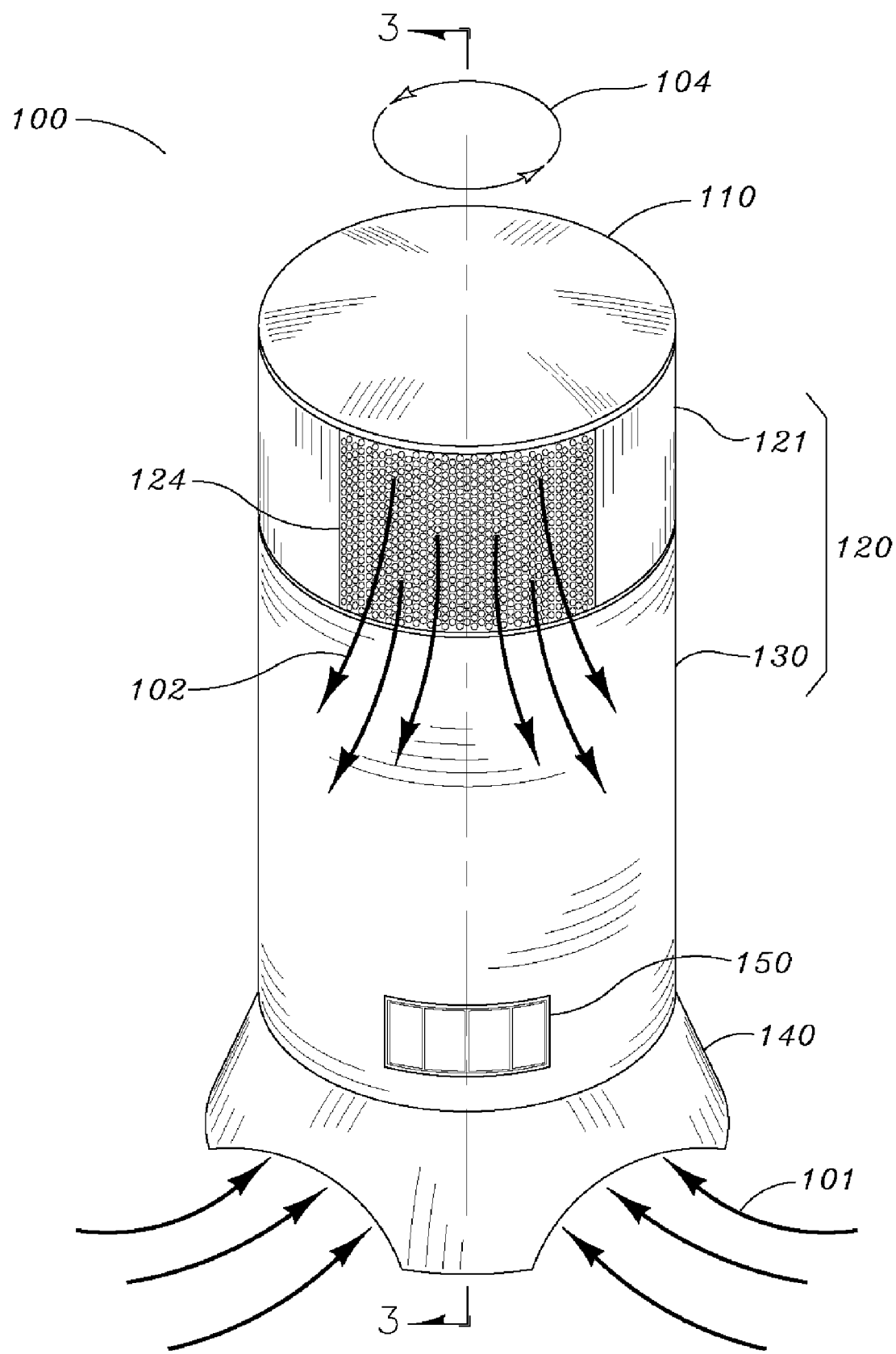
FIG. 1 is a perspective view of an embodiment of the portable space heater with 360° rotation of the present invention.

FIG. 1 is a perspective view of an exemplary portable space heater with 360° rotation 100. Portable space heater with 360° rotation 100 includes base 140, housing 120 and top 110. Housing 120 includes upper portion 121 and lower portion 130. As shown, control 150 may be attached to housing 130. Alternatively control 150 may be attached to base 140 or top 110.

Intake air 101 may be drawn into lower portion 130 and subsequently expelled from upper portion 121 as heated air stream 102. Upper portion 121 is rotatable relative to lower portion 130. Rotational movement 104 of upper portion 121 may be a continuous 360° rotation in either direction. It is also contemplated that rotational movement 104 may be adjustable and/or automatically reversible thereby providing an oscillation motion of upper portion 121 relative to lower portion 130 and base 140. Alternatively, housing 120 may be rotatable relative to base 140.

Heated air stream 102 exits upper portion 121 through outlet 124. Heated air stream 102 is projected into a room throughout the range of rotational movement 104 as outlet 124 moves relative to base 140 and lower portion 130. Unlike a conventional forced air space heater with simultaneous 360° heat discharge, portable space heater with 360° rotation 100 projects heated air stream 102 outward into the room. The outward projection of heated air stream 102 permits greater penetration of the heat generated by portable space heater with 360° rotation 100 into the extents of the room. Greater penetration of the heat combined with the 360° rotation provides a rapid and even heating of a room.

Figure 2:
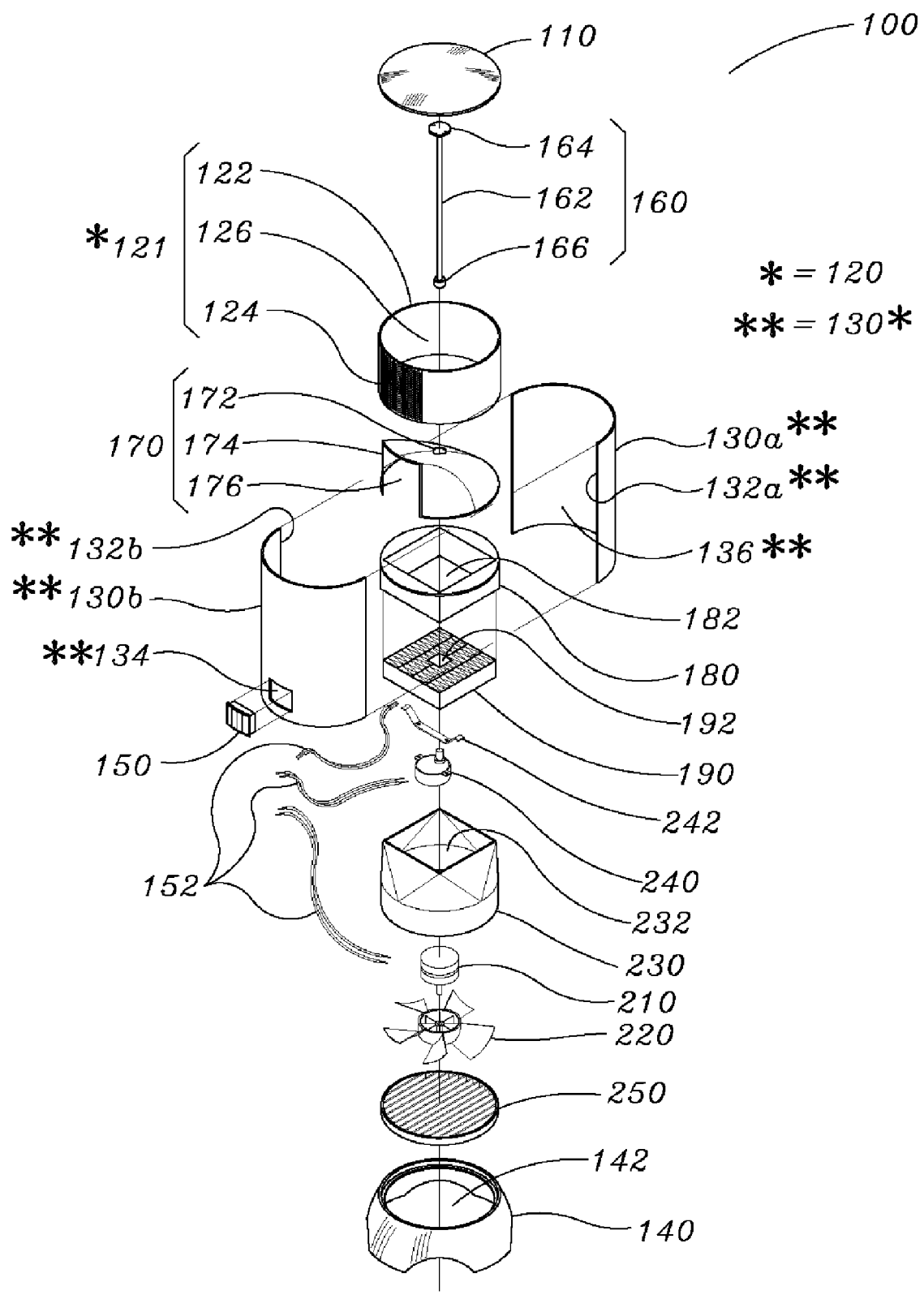
FIG. 2 is an exploded perspective view of the portable space heater with 360° rotation of FIG. 1.

FIG. 2 is an exploded perspective view of portable space heater with 360° rotation 100 of FIG. 1. As shown, base 140 is located below lower portion 130 of housing 120. Lower portion 130 may include rear half 130a and front half 130b. Rear half 130a and front half 130b connect along edges 132a and 132b. When assembled rear half 130a and front half 130b define lower interior space 136.

Motor 210, impeller 220, transition 230, rotation engine 240, bracket 242, heating element 190 and element holder 180 are disposed within lower interior space 136 when assembled. Intake grill 250 may be located proximate space 142 of base 140, as shown, allowing air to enter interior space 136. Motor 210 rotates impeller 220 drawing air through intake grill 250 and into interior space 136. Impeller 220 accelerates the air through transition interior 232 toward heating element 190. Impeller 220 may be an axial flow type impeller. As shown, air passes through heating element 190 and element holder interior 182 and subsequently exits as heated air stream into upper interior space 126 defined by wall 122 of upper portion 121.

As shown, heating element 190 utilizes Positive Temperature Coefficient (PTC) technology. The use of a PTC heating element 190 assures a self-regulating low surface temperature of approximately 450 degrees Fahrenheit (232 degrees Celsius). Although shown as a PTC element the invention is not so limited. It is contemplated that other conventional types of heating elements may be used, such as for example; hot wire or calrod radiator.

Air stream deflector 170 may be disposed within upper interior space 126. As shown, air stream Deflector 170 includes deflector exit 174 and defines deflector interior 176. Heated air enters deflector interior 176 and exits deflector exit 174, being directed toward outlet 124 of upper portion 121. As shown, air stream deflector 170 is designed to efficiently change the flow direction of the heated air steam from a substantially vertical direction to a substantially horizontal direction.

Top 110 is connected to upper portion 121. Drive 160 includes interface 164, shaft 162 and coupling 166. As shown, drive 160 is connected to top 110 via interface 164. As shown, drive 160 is attached to rotation engine 240 via coupling 166. Shaft 162 passes through hole 172 of air stream deflector 170 and gap 192 located in heating element 190.

Top 110, upper portion 121 and air stream deflector 170 may be fixedly connected to one another and rotatably connected to lower portion 130. Rotation engine 240 is fixedly attached to bracket 242. Bracket 242 may be fixedly connected to, for example, element holder 180, transition 230 and/or lower portion 130. As shown, rotation engine 240 may be an electric gear motor. It is contemplated that rotation engine 240 may be a transmission connected to motor 210 or other conventional rotating device.

Rotation engine 240 rotates drive 160 which in turn rotates top 110, upper portion 121 and air stream deflector 170. Heated air enters air stream deflector 170 and is expelled through exit 174 and outlet 124 along an exit flow path. The exit flow path of the heated air is thereby projected outward from portable space heater with 360° rotation 100 and dispersed throughout the room by the rotational movement.

Also shown are electrical wires 152 and control 150. Electrical wires 152 electrically connect the various components, such as for example, control 150, motor 210, rotation engine 240 and heating element 190. Control 150 controls one or more functions of portable space heater with 360° rotation 100, such as for example, rotational speed of impeller 220, power setting of heating element 190, and/or rotational or oscillating movement of upper portion 121. Control 150 is assembled to lower portion 130 through control passage 134. It is contemplated that control 150 may include push buttons, rotary switches, light emitting diodes, power control boards, microcontrollers, and the like.

It is also contemplated that the components of portable space heater with 360° rotation 100 may be assembled using conventional methods, such as for example, snaps, screws, adhesives, press fits, and the like.

Figure 3:
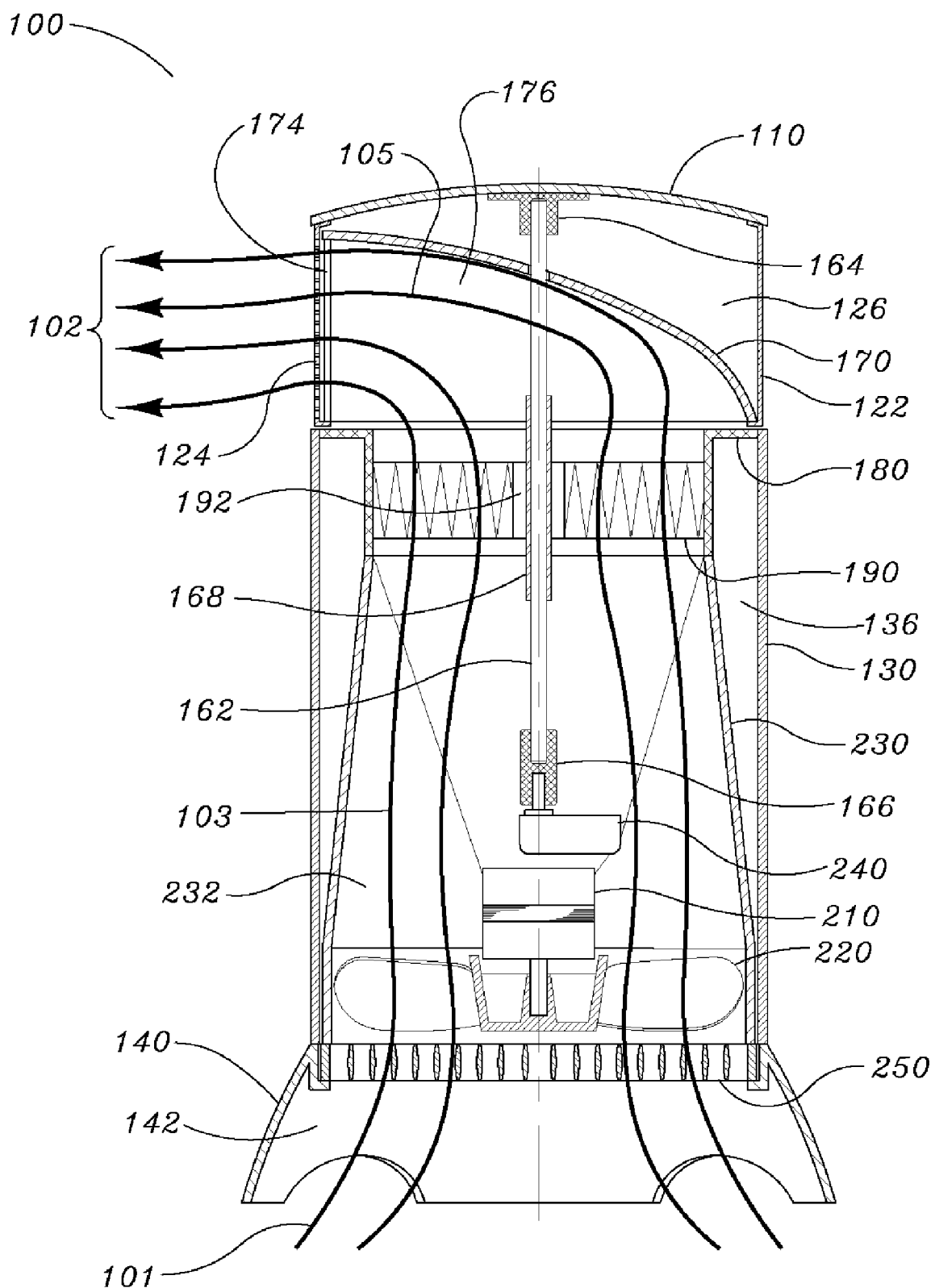
FIG. 3 is a vertical cross section view of the embodiment of the portable space heater with 360° rotation of FIG. 1.

FIG. 3 is a vertical cross section view of portable space heater with 360° rotation 100 of FIG. 1 taken along cross section plane 3-3. As shown, intake air 101 is drawn through base 140 and into lower interior space 136 of lower portion 130. Impeller 220 accelerates the air through transition interior 232 along substantially vertical flow path 103. Intake air 101 passes through heating element 190 and enters upper interior space 126 as heated air stream 102. Upon entering upper interior space 126 heated air stream 102 simultaneously enters deflector interior 176.

The flow path of heated air stream 102 is redirected by air stream deflector 170 along exit flow path 105. Exit flow path 105 is directed through deflector exit 174 and outlet 124 and subsequently exits as heated air stream 102 traveling along exit flow path 105 away from portable space heater with 360° rotation 100. As shown exit flow path 105 is substantially horizontal.

As shown, air stream deflector 170 is a separate component and may be fabricated of metal, heat resistant polymer (V0) and the like. It is also contemplated that air stream deflector 170 may be unitary with other components such as top 110 or wall 122.

Drive 160 may include shield tubing 168. Shield tubing 168 protects shaft 162 passing through gap 192 of heating element 190. Shaft 162 may be constructed of steel or heat resistant polymer (V0) rated. Interface 164 is shown connected to top 110, however it is contemplated that interface 164 may be connected to air stream deflector 170.

As can be appreciated, the ability to rotate only top 110, upper portion 121 and air stream deflector 170 has several advantages. Rotation engine 240 and drive 160 are not required to move all of the components of the device, such as for example motor 210, impeller 220, transition 230, heating element 190, element holder 180 or lower portion 130. The construction of rotation engine 240 and drive 160 can therefore utilize smaller, lighter and less expensive components.

Another advantage is the absents of movement of electrical wires 152 (see FIG. 2). The repeated movement of electrical wires 152 may cause fatigue failure of electrical wires 152 and their connections. These failures can engender safety compromises within the device.

Figure 4:
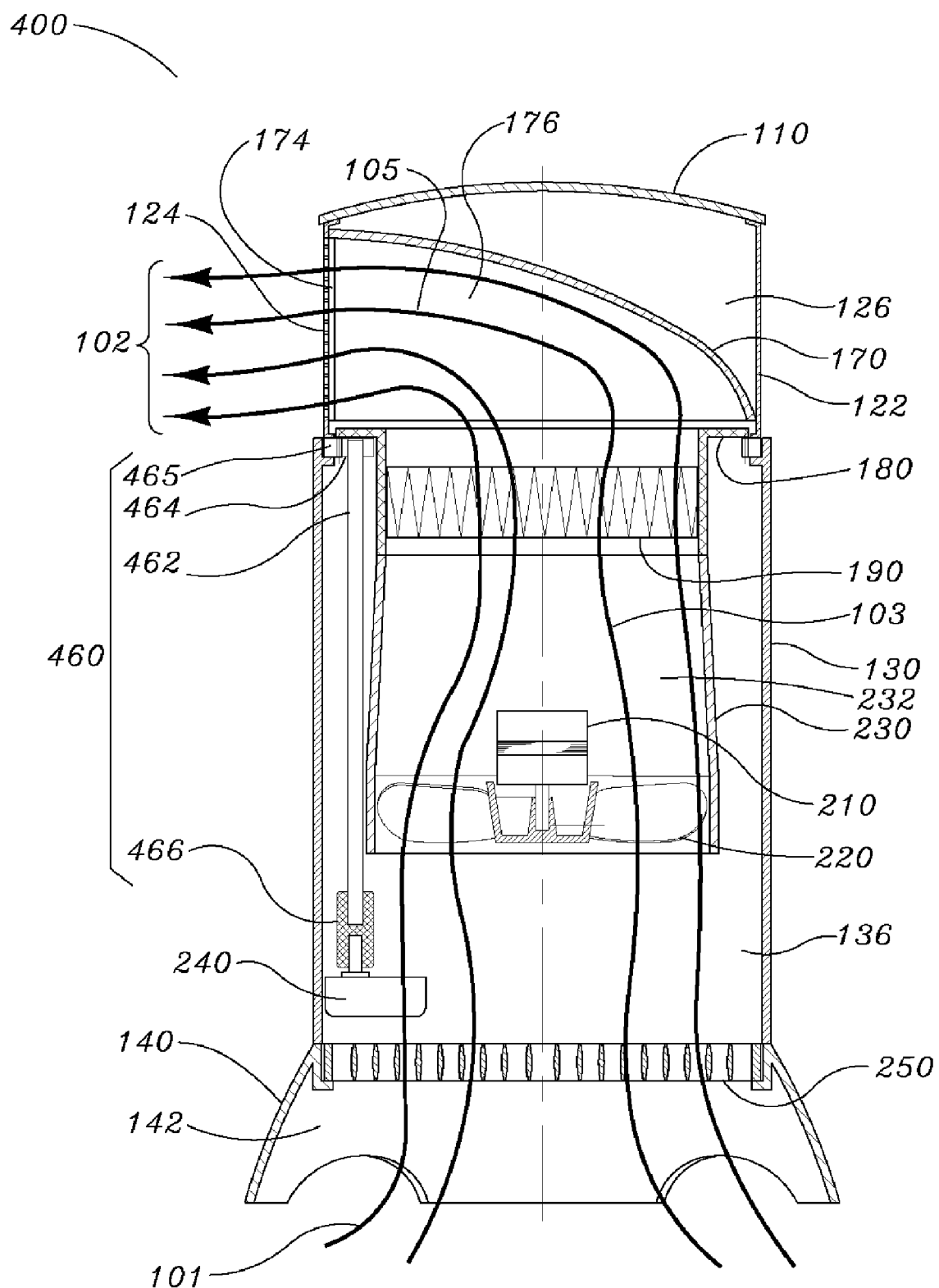
FIG. 4 is a vertical cross section view of another embodiment of the portable space heater with 360° rotation of the present invention.

FIG. 4 is a vertical cross section view of another embodiment of portable space heater with 360° rotation 400. Drive 460 may include coupling 466, shaft 462, pinion gear 464 and ring gear 465. Wall 122, air stream deflector 170 and top 110 are connected to ring gear 465. Ring gear 465 is rotatably connected to lower portion 130.

Rotation engine 240 rotates shaft 462 and pinion gear 464. Pinion gear 464 engages and rotates ring gear 465, wall 122, air stream deflector 170 and top 110. As shown, rotation engine 240 and shaft 462 are offset to a side of heating element 190. The offset location of drive 460 maintains all of the components of drive 460 away from heated air stream 102. Minimizing the exposure of drive 460 to heated air stream 102 reduces the need for expensive heat resistant materials.

In all other aspects, portable space heater with 360° rotation 400 is similar to portable space heater with 360° rotation 100 of FIG. 3.

Figure 5:
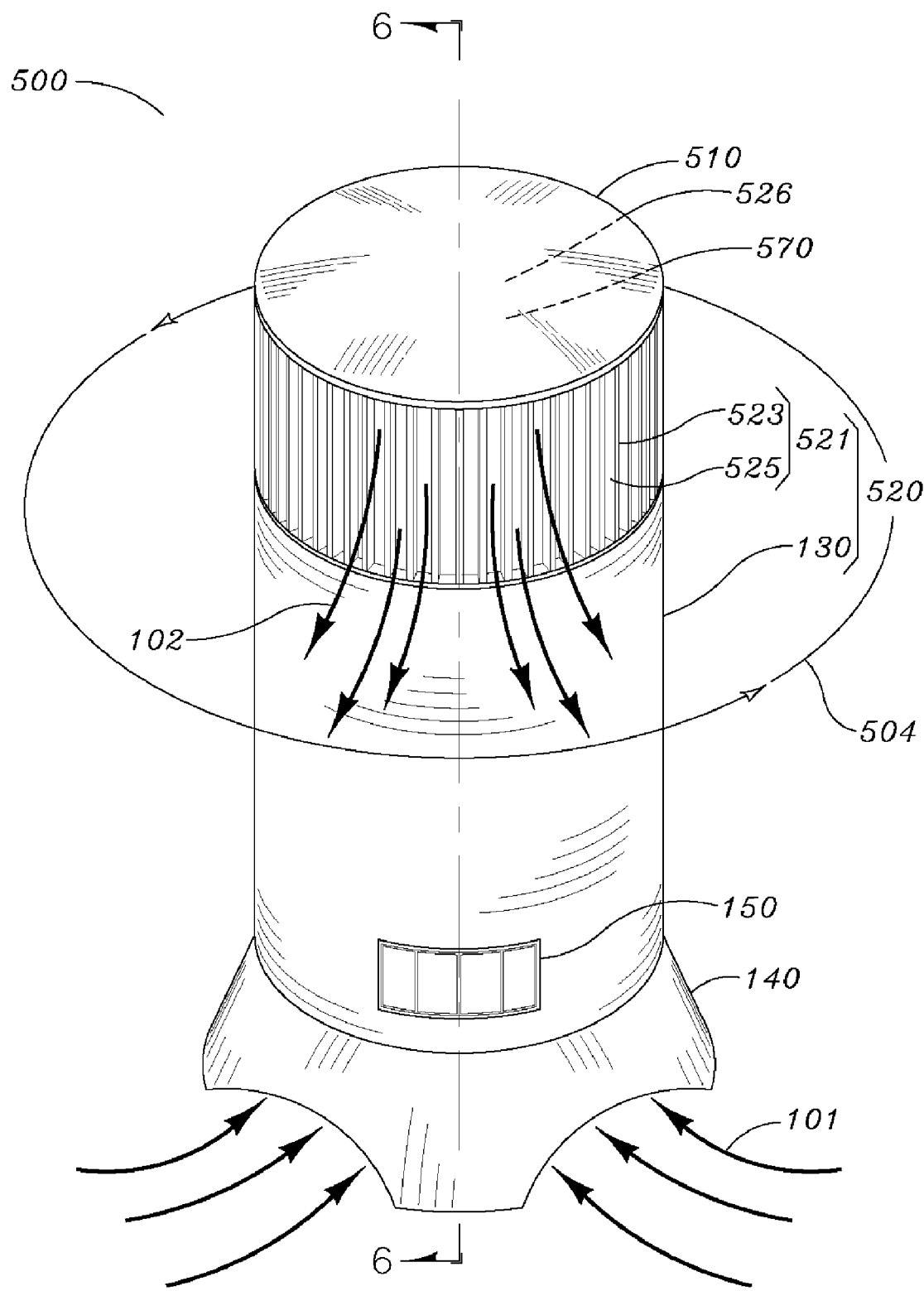
FIG. 5 is a perspective view of another embodiment of the portable space heater with 360° rotation.

FIG. 5 is a perspective view of another embodiment of portable space heater with 360° rotation 500. Similar to portable space heater with 360° rotation 100 of FIG. 1, portable space heater with 360° rotation 500 includes base 140, housing 520 and top 510. Housing 520 includes upper portion 521 and lower portion 130.

As shown, upper portion 521 includes grill elements 523 and openings 525 completely around the periphery of upper portion 521. Unlike upper portion 121 and top 110 of portable space heater with 360° rotation 100 of FIG. 1, top 510 and upper portion 521 do not rotate.

Top 510 and upper portion 521 define upper interior space 526. Disposed within interior space 526 is air stream deflector 570. Air stream deflector 570 is rotated with reference to housing 520, top 510 and base 140. Rotational movement 504 of air stream deflector 570 may be continuous 360° rotation in either direction. It is also contemplated that rotational movement 504 may be adjustable and/or automatically reversible thereby providing an oscillation motion of upper portion air stream deflector 570.

Heated air stream 102 exits upper portion 521 through openings 525. Heated air stream 102 is projected into a room throughout the range of rotational movement 504 as air stream deflector 570 rotates. As such, the rotational projection of heated air stream 102 is achieved absent a visible movement of portable space heater with 360° rotation 500. The absents of visible movement decreases the disruptive qualities of portable space heater with 360° rotation 500. In all other aspects, portable space heater with 360° rotation 500 is similar to portable space heater with 360° rotation 100 of FIG. 1.

Figure 6:
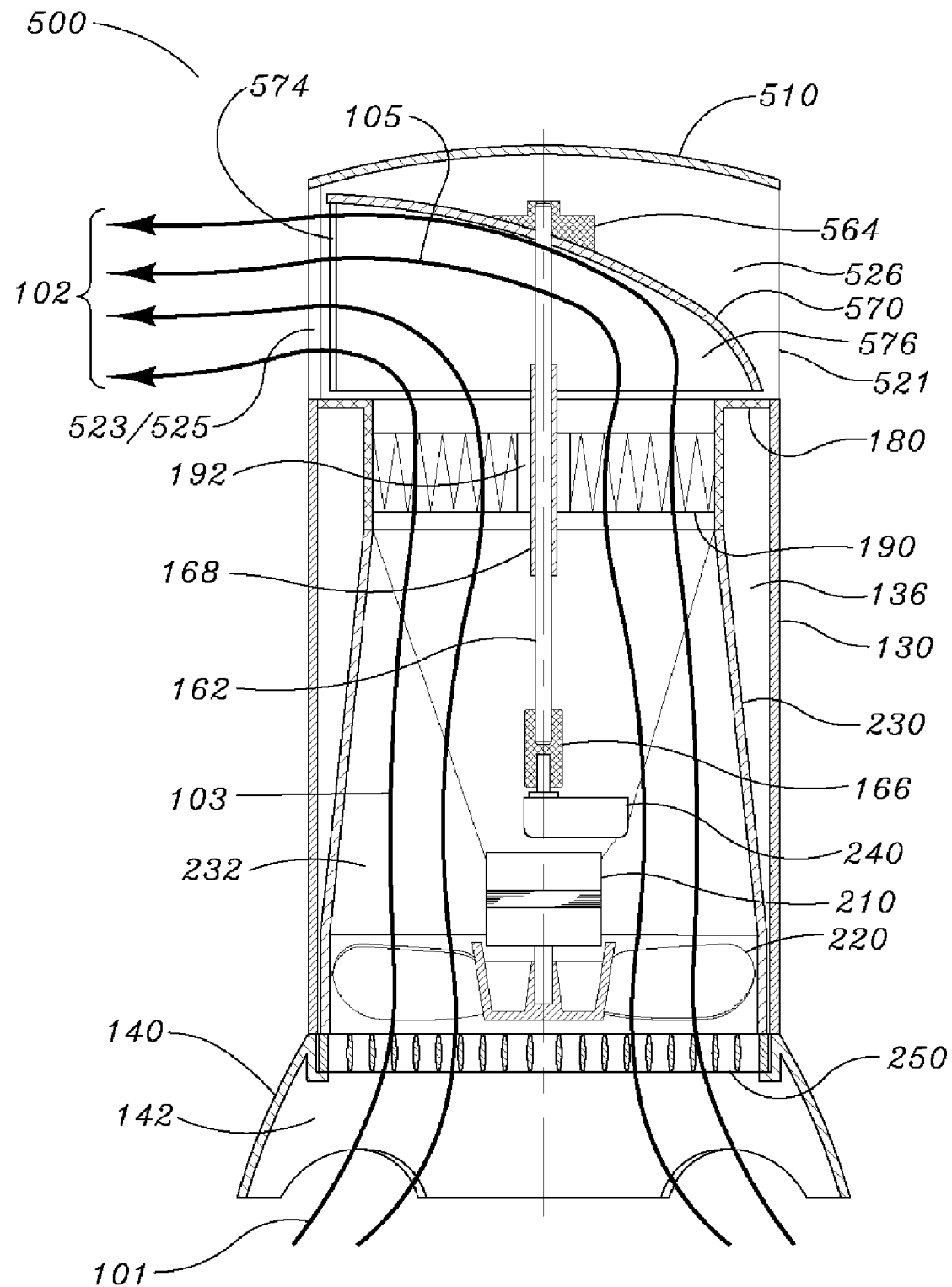
FIG. 6 is a vertical cross section view of the embodiment of the portable space heater with 360° rotation of FIG. 5.

FIG. 6 is a vertical cross section view of portable space heater with 360° rotation 500 of FIG. 5 taken along cross section plane 6-6. As shown, shaft 162 is connected to interface 564. Interface 564 is connected to air stream deflector 570.

Similar to space heater with 360° rotation 100 of FIG. 3, intake air 101 is drawn through base 140 and into lower interior space 136 of lower portion 130. Impeller 220 accelerates the air through transition interior 232 along substantially vertical flow path 103. Intake air 101 passes through heating element 190 and enters upper interior space 526 as heated air stream 102. Upon entering upper interior space 526 heated air stream 102 simultaneously enters deflector interior 576.

The flow path of heated air stream 102 is redirected by air stream deflector 570 along exit flow path 105. Exit flow path 105 is directed through deflector exit 574 and through openings 525 between grill elements 523. Unlike space heater with 360° rotation 100 of FIG. 3, air stream deflector 570 rotates relative to top 510 and upper portion 521.

Figure 7:
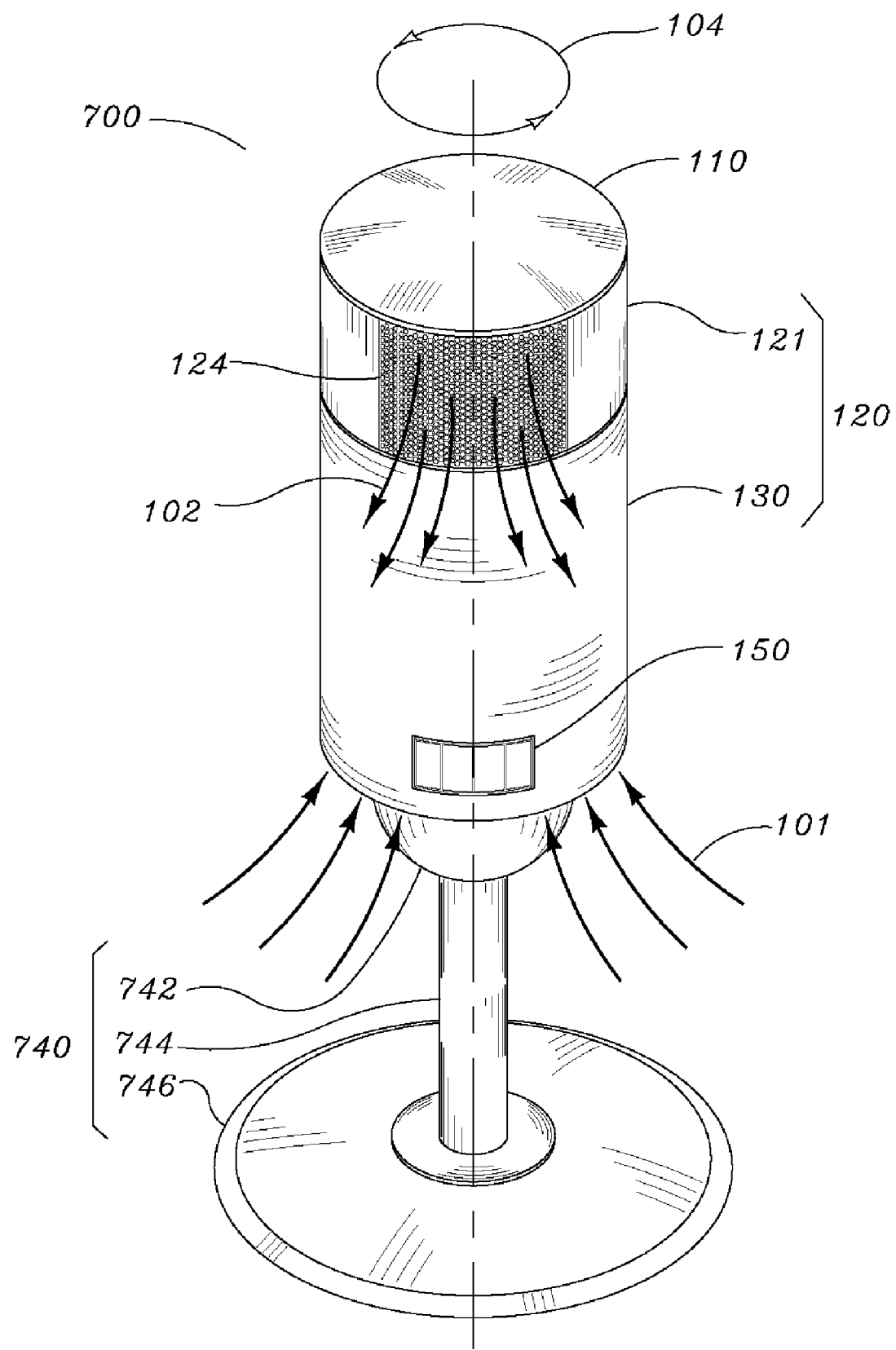
FIG. 7 is a perspective view of another embodiment of the portable space heater with 360° rotation of the present invention.

FIG. 7 is a perspective view of portable space heater with 360° rotation 700. Similar to portable space heater with 360° rotation 100 of FIG. 1, portable space heater with 360° rotation 700 includes: housing 120 and top 110. Housing 120 includes upper portion 121 and lower portion 130.

In lieu of base 140 of portable space heater with 360° rotation 100 of FIG. 1, portable space heater with 360° rotation 700 may include riser 740. Riser 740 may include base 746, column 744 and adaptor 742. Adaptor 742 connects to housing 120. As shown, intake air 101 is drawn into housing 120 and heated air stream 102 exits housing 120 through outlet 124.

Riser 740 is used to further elevate heated air stream 102. Elevating heated air stream 102 serves to locate the heat generated by portable space heater with 360° rotation 700 closer to the upper body of the user. The upper body is generally more exposed and will receive heat relief more readily if the heated air stream 102 exits the housing 120 at an elevation above the support surface. Elevating heated air stream 102 equates to a more rapid detection of the desired heating effects of the device by the user.

Figure 8:
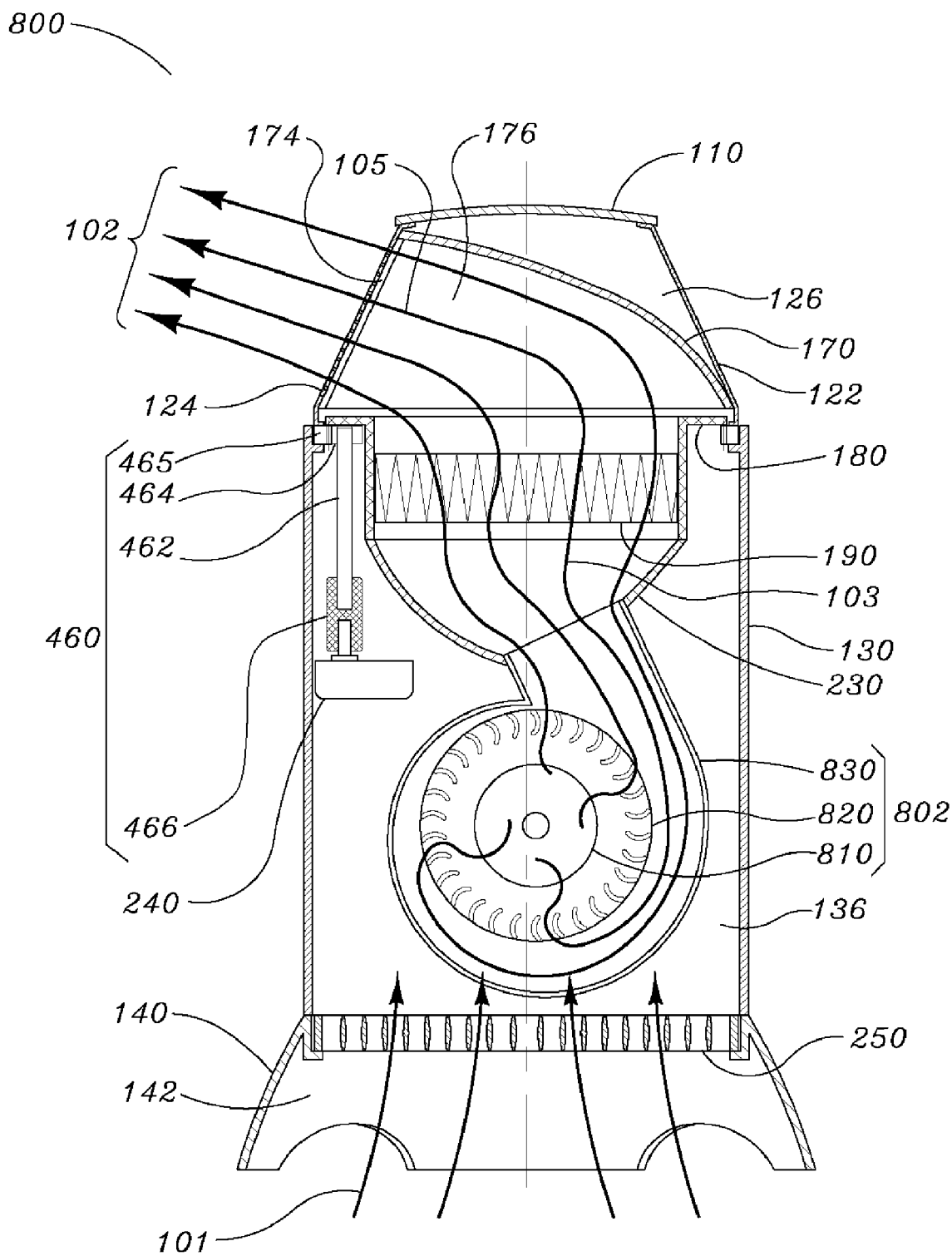
FIG. 8 is a vertical cross section view of another embodiment of the portable space heater with 360° rotation of the present invention.

FIG. 8 is a vertical cross section view of another embodiment of the portable space heater with 360° rotation 800. As shown, portable space heater with 360° rotation 800 may include centrifugal blower 802. Centrifugal blower 802 includes motor 810, centrifugal impeller 820 and impeller scroll 830.

As shown, intake air 101 is drawn through base 140 and into lower interior space 136 of lower portion 130. Intake air is subsequently drawing into impeller scroll 830 and accelerated by centrifugal impeller 820. Intake air 101 passes through transition 230 and heating element 190 and enters upper interior space 126 as heated air stream 102. Upon entering upper interior space 126 heated air stream 102 simultaneously enters deflector interior 176.

Heated air 102 exits portable space heater with 360° rotation 800 along exit flow path 105. As can be seen, exit flow path 105 is not completely horizontal. It can be appreciated however, that exit flow path 105 has a significant horizontal element serving to project heated air 102 away from portable space heater with 360° rotation 800 and into a room. The upwardly inclined exit flow path 105 serves to direct heated air 102 toward the upper body of the user, thereby engendering some of the advantages described in conjunction with portable space heater with 360° rotation 700 of FIG. 7.

In all other aspects, portable space heater with 360° rotation 800 is similar to portable space heater with 360° rotation 400 of FIG. 4.

Figure 9:
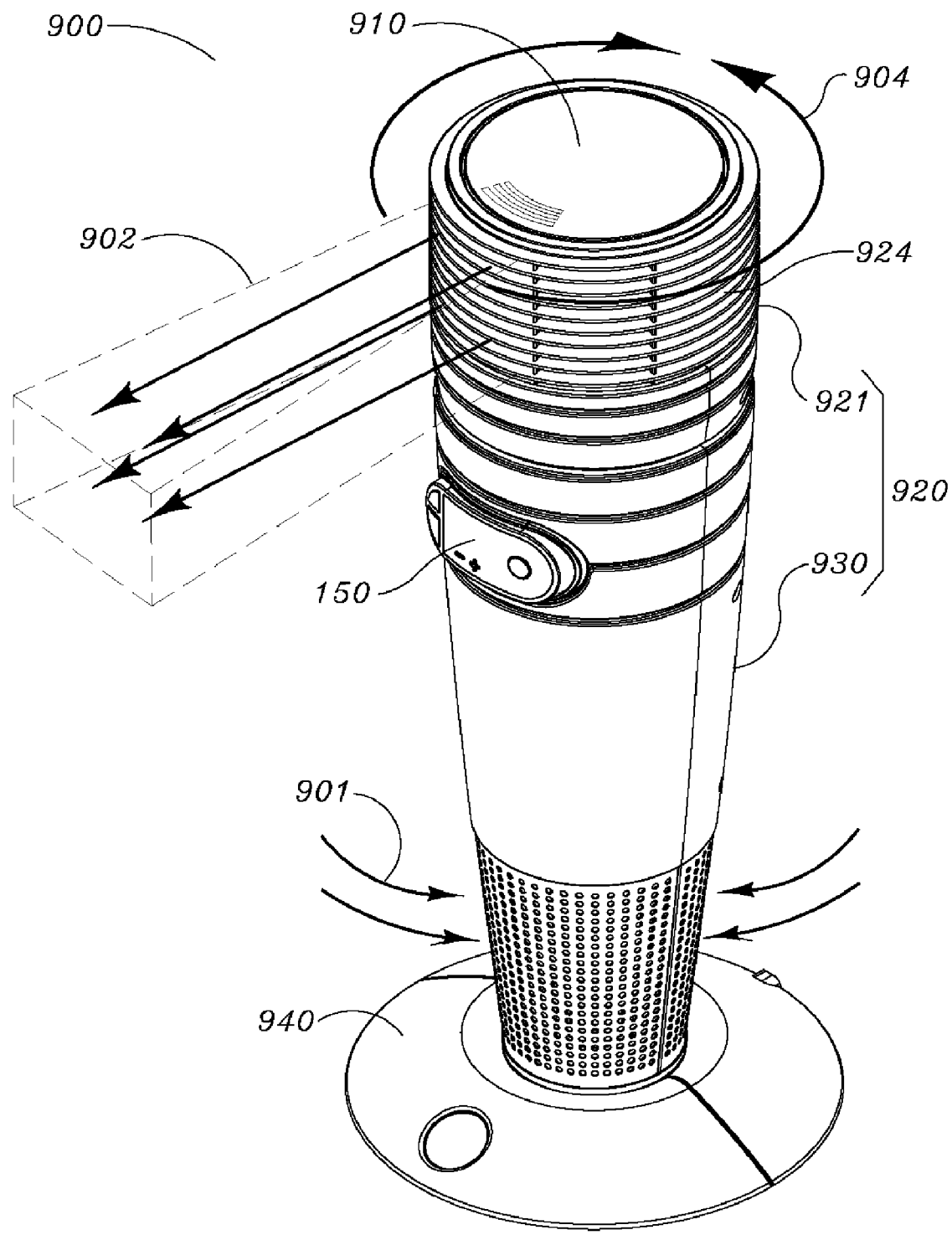
FIG. 9 is a front perspective view of another embodiment of the portable space heater with 360° rotation of the present invention.

FIG. 9 is a front perspective view of yet another embodiment of portable space heater with 360° rotation 900. As shown, portable space heater with 360° rotation 900 includes base 940, housing 920 and top 910. Housing 920 includes upper portion 921 and lower portion 930. Control 150 may be attached to housing 930, top 910 and/or base 940.

As shown, intake air 901 may be drawn into lower portion 930 and subsequently expelled from upper portion 921 as heated air stream 902. Heated air stream 902 of the present embodiment is rotatable relative to lower portion 930, upper portion 921 and base 940. Rotational movement 904 of heated air stream 902 may be a continuous 360° rotation in either direction. It is also contemplated that rotational movement 904 may be adjustable and/or automatically reversible thereby providing an oscillation motion of heated air stream 902 relative to lower portion 930, upper portion 921 and base 940.

Heated air stream 902 exits upper portion 921 through outlet 924. As shown, outlet 924 extends completely around the perimeter of upper portion 921. Heated air stream 902 is projected into a room throughout the range of rotational movement 904. Unlike a conventional forced air space heater with simultaneous 360° heat discharge, portable space heater with 360° rotation 100 projects heated stream 902 outward into the room. In most other aspect, portable space heater with 360° rotation 900 is similar to portable space heater with 360° rotation 100 of FIG. 1.

Figure 10:
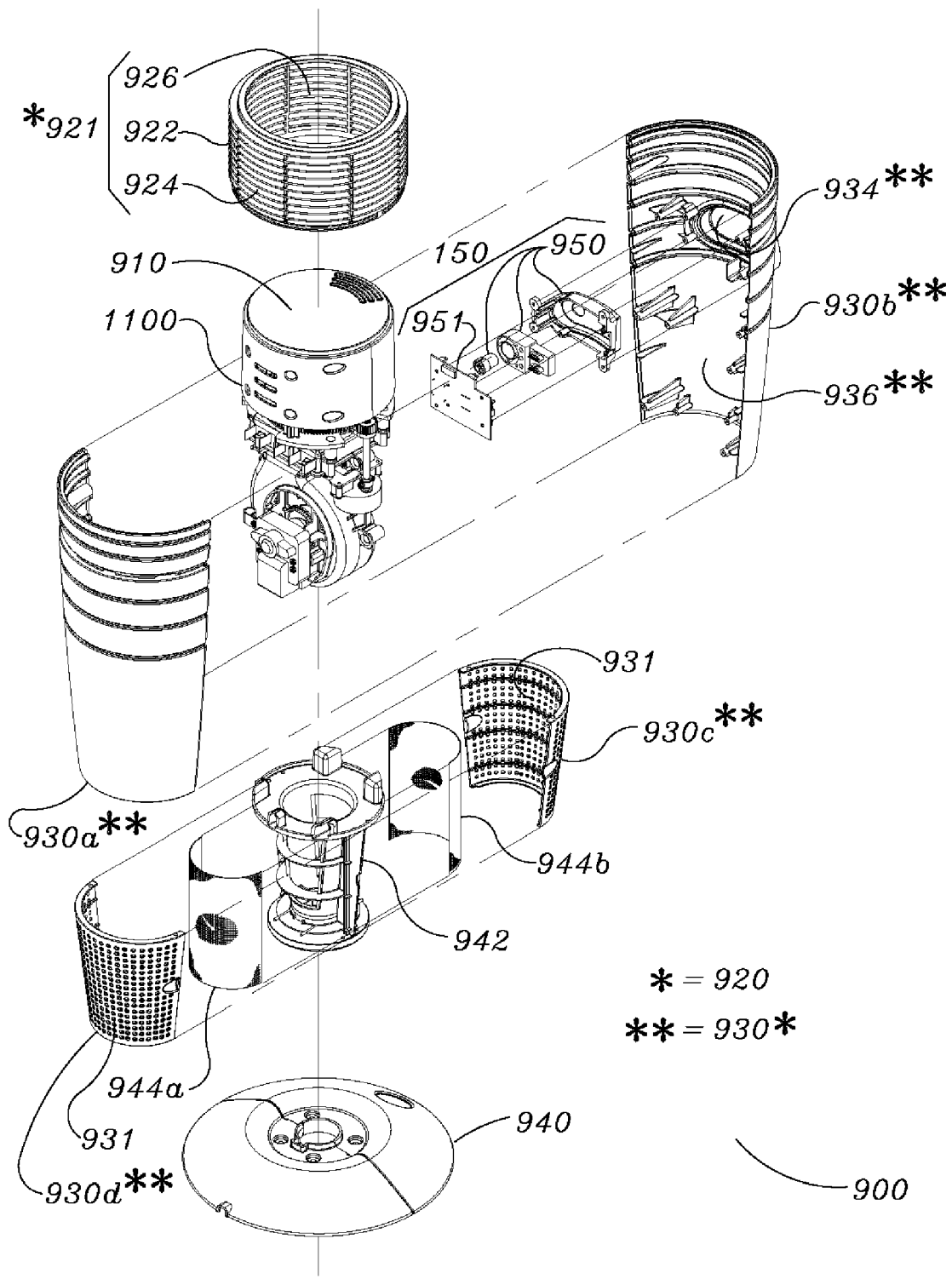
FIG. 10 is an exploded rear perspective view of the embodiment of the portable space heater with 360° rotation of FIG. 9.

FIG. 10 is an exploded rear perspective view of portable space heater with 360° rotation 900 of FIG. 9. As shown, housing 920 includes lower portion 930 and upper portion 921. Lower portion 930 may include rear quarters 930a, 930d and front quarters 930b, 930c. When assembled rear quarters 930a, 930d and front quarters 930b, 930c define lower interior space 936. Upper portion 921 may includes wall 922 and defines upper interior space 926. Air outlet 924 extends completely around the periphery of wall 922 of upper portion 921. Base 940 is located below lower portion 930 of housing 920.

Disposed within lower interior space 936 is housing support 942. Filter elements 944a and 944b are attached to housing support 942. As shown, rear quarter 930d and front quarter 930c include passageways 931 and enclose housing support 942 and filter elements 944a and 944b. In the exemplary embodiment rear quarter 930d and front quarter 930c are detachably connected to rear quarter 930a and rear quarter 930b and base 940. Rear quarter 930d and front quarter 930c can be removed to access and clean filter elements 944a and 944b.

As shown, control 150 includes PCB board 951 and covers 950. Control 150 is attached to front quarter 930 and is made accessible to the user through control opening 934.

Blower/heater/deflector assembly 1100 is disposed partially within upper interior space 926 and partially within lower interior space 936. As shown, top 910 is connected to blower/heater/deflector assembly 1100.

Figure 11:
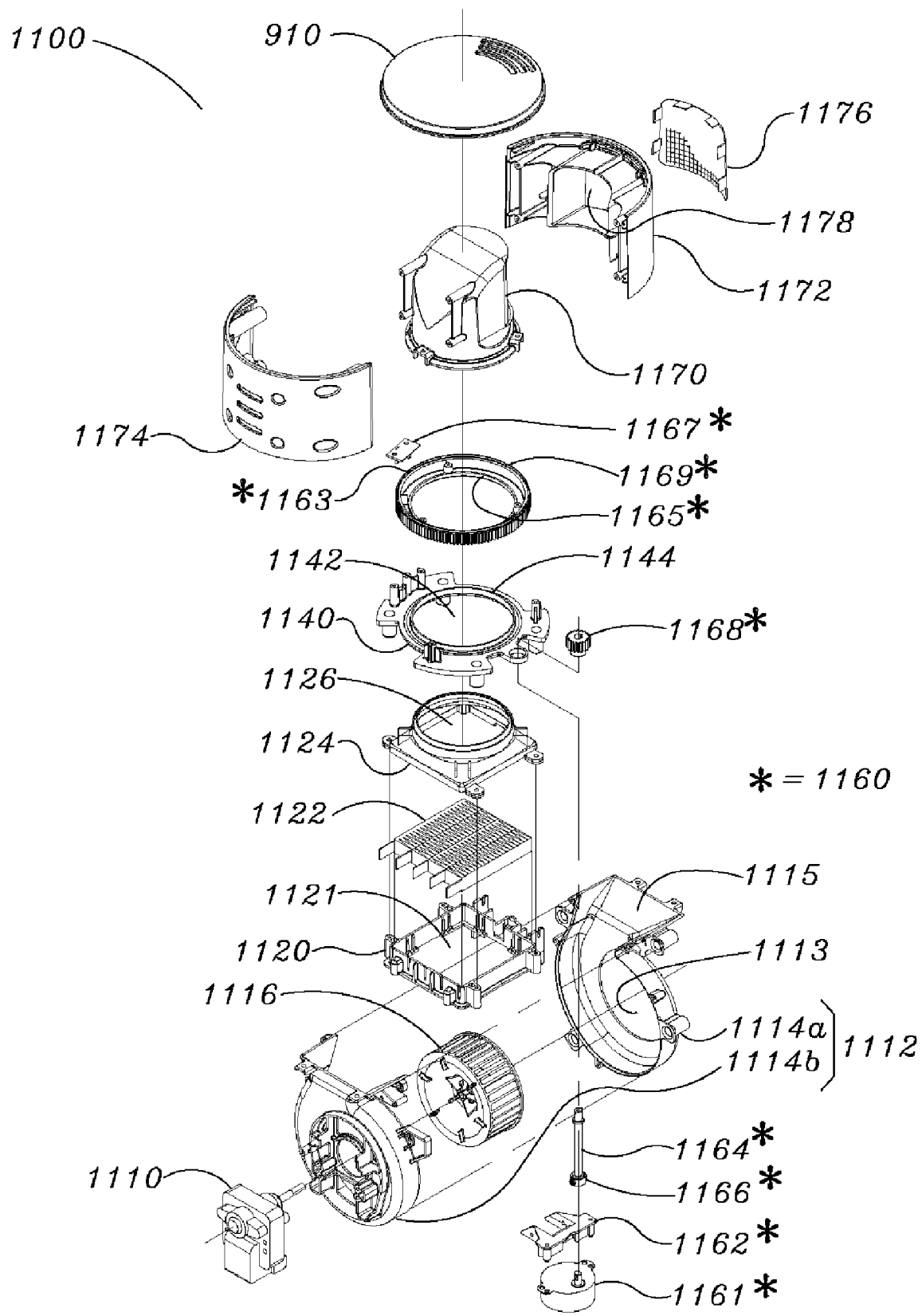
FIG. 11 is a partial exploded perspective view of the embodiment of the blower/heater/deflector assembly of FIG. 10.

FIG. 11 is a partial exploded perspective view of Blower/heater/deflector assembly 1100 of the portable space heater with 360° rotation 900 of FIG. 10. As shown, scroll housing 1112 includes scroll half 1114a and 1114b. Motor 1110 is attached to scroll half 1114b. Impeller 1116 is disposed within scroll 1112 and is connected to and rotated by motor 1110. Also shown is air entry port 1113 and air exit port 1115.

Element holder 1120 is attached proximate air exit port 1115 of scroll housing 1112. Electric heating element 1122 is disposed within space 1121 of element holder 1120. Transition 1124 is attached to element holder 1120 and includes passageway 1126. Passageway 1126 is aligned with open area 1142 of rotational support plate 1140. Rotational support plate 1140 also includes pilot ring 1144.

Drive 1160 is used to effect rotational movement 904 of the heated air stream 902 (see FIG. 9). Drive 1160 includes bracket 1162 connected to scroll housing 1112 and rotational engine 1161 connected to bracket 1162. Coupling 1166 is attached to rotational engine 1161 and shaft 1164. Pinion gear 1168 is attached to an opposite end of shaft 1164 relative to coupling 1166 and interfaces with ring gear 1169. Pilot diameter 1165 of ring gear 1169 is disposed over pilot ring 1144 of rotational support plate 1140 and serves to guide and stabilize rotational movement 904 of heated air stream 902.

Also shown is position switch 1167. Position switch 1167 is used in conjunction with control 150 (see FIG. 10) to control the rotational movement 904 of heated air stream 902. Position switch 1167 is utilized to detect an indicator or multiple indicators on ring gear 1169. In the present embodiment, position switch 1167 is a transmitter/receiver combination that detects the indicator, shown as notch 1163 located in ring gear 1169. Position switch 1167 is mounted to rotational support plate 1140 in the exemplary embodiment.

Although shown as a transmitter/receiver combination, position switch 1167 is not so limited. It is contemplated that position switch 1167 could be another type of switch, such as for example, a mechanical contact switch.

Air stream deflector 1170 is connected to ring gear 1169 and rotates in conjunction with ring gear 1169. Shields 1172 and 1174 are connected to air stream deflector 1170. Shields 1172 and 1174 are utilized to fill the area behind air outlet 924 which extends completely around the periphery of wall 922 of upper portion 921, (see FIG. 10). Filling the area as described prevents the intrusion of foreign objects into interior space 926 of upper portion 921. Safety grill 1176 is located proximate exhaust opening 1178 located in shield 1172. In the exemplary embodiment, top 910 is connected to shields 1172 and 1174 and air stream deflector 1170 and rotates in conjunction with ring gear 1169.

In operation, intake air 901 is drawn into interior space 936 of portable space heater with 360° rotation 900 through passageways 931 by a rotation of impeller 1116. Intake air 901 subsequently passes through filter elements 944a and 944b and enters air entry port 1113 of scroll housing 1112. Impeller 1116 accelerates intake air 901 which is subsequently projected through air exit port 1115 toward and through electric heating element 1122.

Intake air 901 exits electric heating element 1122 as heated air stream 902 and is projected into air stream deflector 1170. Air stream deflector 1170 directs the flow of heated air stream 902 toward exhaust opening 1178 and safety grill 1176. Heated air stream 902 subsequently passes through air outlet 924 of wall 922 of upper portion 921 and is projected away from portable space heater with 360° rotation 900, as shown in FIG. 9.

The various embodiments of a portable space heaters with 360° rotation 100, 400, 500, 700, 800 and 900 described herein overcome several deficiencies of conventional space heaters. The portable space heater with 360° rotation of the present invention reduces air temperature stratification and uneven heating problems of a room thereby eliminating the creation of hot and cold zones.

Homogenized heat distribution is achieved by directing the radially outward flow of the heated air stream through 360° of rotation. The outward projection of the heated air stream permits greater penetration of the heat into the extents of the room. Greater penetration of the heated air stream in combination with 360° rotational movement provides a rapid and even heating of a room.

Although the invention has been described with reference to exemplary embodiments, it is not limited thereto. Rather, the appended claims should be construed to include other variants and embodiments of the invention, which may be made by those skilled in the art without departing from the true spirit and scope of the present invention.

What is claimed:

1. A portable space heater comprising;
a housing comprising;
 a wall defining an interior space;
 an air inlet located in a lower portion of said housing;
 an air outlet located in an upper portion of said housing;
a base supporting said housing relative to a support surface;
an electric motor disposed within said interior space;
an impeller rotatably disposed within said interior space between said air inlet and said air outlet, said impeller connected to and rotated by said electric motor;
a rotational engine disposed within said interior space;
an air stream deflector rotatably disposed within said interior space between said impeller and said air outlet, said air stream deflector operatively coupled to said rotational engine, said air stream deflector extending at least partially within said upper portion of said housing and toward said air outlet;
a drive operatively coupled between said air stream deflector and said rotational engine, wherein said rotational engine rotates said drive thereby causing said air stream deflector to rotate;
an axis of rotation about which said air stream deflector is rotated, said axis of rotation comprising a substantially perpendicular axis of rotation relative to said support surface;
an electric heating element disposed within said interior space between said impeller and said air stream deflector;
a heated air stream exiting said interior space through said air outlet and projected substantially radially outward from said housing;
a flow path of said heated air stream exiting said interior space comprising a substantially parallel flow path relative to said support surface; and
wherein said air stream deflector may be rotated using said rotational engine to cause said flow path of said heated air stream to move relative to said base.

2. The portable space heater of claim 1, wherein said air stream deflector is capable of 360° rotation about said axis of rotation.

3. The portable space heater of claim 2, wherein a direction of said rotation of said air stream deflector can be reversed at predetermined intervals to achieve an oscillating movement of said flow path of said heated air stream.

4. The portable space heater of claim 3, wherein said predetermined intervals can be changed to yield different angular ranges of a horizontal oscillating movement of said flow path of said heated air stream.

5. The portable space heater of claim 1, wherein said housing further comprises a stationary lower portion, wherein said impeller, said electric motor, said rotational engine said electric heating element, and electrical wires electrically connected to said motor and said rotational engine are located in said stationary lower portion.

6. The portable space heater of claim 5, wherein said upper portion of said housing is stationary, wherein said air outlet further comprises openings that extend completely around a periphery of said upper portion of said housing wall.

7. The portable space heater of claim 5, wherein said upper portion of said housing is rotatable with said air stream deflector, wherein said air outlet further comprises one or more openings that only extend around a portion of a periphery of said upper portion of said housing wall.

8. The portable space heater of claim 5, wherein said flow path of said heated air stream moves relative to said stationary lower portion of said housing in conjunction with said rotation of said air stream deflector.

9. The portable space heater of claim 8, wherein said flow path of said heated air stream moves relative to said upper portion of said housing in conjunction with said rotation of said air stream deflector.

10. The portable space heater of claim 1, further comprising a longitudinal centerline of said housing, wherein said impeller, said electric motor, and said electric heating element are located along said centerline and positioned in-line with one another.

11. The portable space heater of claim 10, wherein said rotational engine is located along said centerline and positioned in-line with said impeller, said electric motor, and said electric heating element.

12. The portable space heater of claim 1, wherein a direction of said rotation of said air stream deflector can be reversed at predetermined intervals to achieve an oscillating movement of said flow path of said heated air stream.

13. The portable space heater of claim 1, further comprising:
    intake air entering said first interior space through said air inlet, said intake air induced to enter said interior space by a rotation of said impeller;
    an internal intake air stream generated by said rotation of said impeller, said internal intake air stream flowing along a first flow path from said impeller toward said electric heating element, said first flow path being substantially perpendicular to said support surface; and
    an internal heated exhaust air stream generated by passing said internal intake air through said electric heating element, said internal heated exhaust air stream flowing along a second flow path from said electric heating element toward said air stream deflector, said second flow path being substantially perpendicular to said support surface;
    wherein said second flow path of said internal heated exhaust air stream is substantially orthogonal to said flow path of said heated air stream exiting said interior space.

14. The portable space heater of claim 1, wherein said drive further comprises a shaft having an axis of rotation, wherein said axis of rotation of said shaft is in-line with said air stream deflector axis of rotation.

15. The portable space heater of claim 14, wherein said rotational engine is positioned below said electric heating element within said interior space of said housing, wherein said shaft passes through a gap in said electric heating element as said shaft extends between said rotational engine and said air stream deflector.

16. The portable space heater of claim 1, wherein said drive further comprise a shaft having an axis of rotation, wherein said axis of rotation of said shaft is off-set from said air stream deflector axis of rotation.

17. The portable space heater of claim 16, wherein said rotational engine is positioned below said impeller within said interior space of said housing.

18. The portable space heater of claim 16, wherein said rotational engine is positioned between said impeller and said electric heating element within said interior space of said housing.

19. The portable space heater of claim 16, further comprising;
    a pinion gear connected to an opposite end of said shaft relative to said rotational engine; and
    a ring gear engaging said pinion gear and connected to said air stream deflector;
    wherein pinion gear is rotated by said shaft and said ring gear is rotated by said pinion gear and said air stream deflector is rotated by said ring gear.

20. The portable space heater of claim 1, wherein said drive further comprises a shaft, wherein said air stream deflector is directly connected to and rotated by said shaft.

21. The portable space heater of claim 1, further comprising a control and electrical wires, said electrical wires electrically connect said control, said electric motor, said electric heating element and/or said rotational engine, and wherein said electric wires are stationary during said rotation of said air stream deflector.

22. The portable space heater of claim 1, further comprising a riser disposed between said base and said housing for elevating said housing above said support surface, said riser comprising an adaptor and a column, wherein said column is attached to said base and said adaptor is attached to said housing.

23. The portable space heater of claim 1, further comprising an impeller scroll wherein said electric motor, said impeller and said impeller scroll comprise a centrifugal blower.

24. The portable space heater of claim 1, wherein said air stream deflector further comprises:
    an air stream deflector housing defining a deflector interior space;
    a deflector inlet facing downward and in fluid communication with said electric heating element; and
    a deflector exit facing radially outward, a width of said deflector exit being less than 360° around a periphery of said air stream deflector housing.

25. The portable space heater of claim 24, wherein said width of said deflector exit being less than about 30° around said periphery of said air stream deflector housing.

26. A blower, heater and deflector combination for use with a portable electric heater comprising;
    a scroll housing comprising;
        a wall;
        an air entry port;
        an air exit port;
    a motor attached to said scroll housing;
    an impeller disposed within said scroll housing and attached to said motor;
    an air stream generated by a rotation of said impeller by said motor;

a first flow path of said air stream passing from said impeller through said exit port of said scroll housing;
an electric heating element located within said flow path of said air stream subsequent to said exit port;
a heated air stream generated by passing said air stream through said electric heating element;
a second flow path of said heated air stream exiting said electric heating element;
an air stream deflector located in said second flow path and rotatably connected to said scroll housing, said motor and said electric heating element;
a third flow path of said heated air stream exiting said air stream deflector, wherein said third flow path of said heated air stream is substantially orthogonal to said second flow path of said heated air stream;
a rotational engine operatively coupled to said air stream deflector, wherein said air stream deflector is rotated about an axis of rotation and said axis of rotation is substantially orthogonal to said third flow path; and
wherein said air stream deflector is capable of rotating 360° relative to said scroll housing, said motor and said electric heating element.

27. The combination of claim 26, wherein said portable electric heater further comprises:
a housing comprising;
a wall defining an interior space;
an air inlet located in a lower portion of said wall;
an air outlet located in an upper portion of said wall;
said blower, heater and deflector combination disposed within said interior space of said housing;
wherein said housing is stationary with reference to said scroll housing, said motor and said electric heating element during said rotation of said air stream deflector.

28. The combination of claim 26, further comprising:
a shaft extending between said air stream deflector and said rotational engine and connected to said air stream deflector and said rotational engine; and
wherein said shaft is rotated by said rotational engine and said air stream deflector is rotated by means of said shaft.

29. The combination of claim 28, further comprising;
a pinion gear connected to an opposite end of said shaft relative to said rotational engine; and
a ring gear engaging said pinion gear and connected to said air stream deflector;
wherein said shaft is rotated by said rotational engine and pinion gear is rotated by said shaft and said ring gear is rotated by said pinion gear and said air stream deflector is rotated by said ring gear.

30. A method of improving said heating effect of a portable electric heater, said method comprising:
providing a housing wall defining an interior space;
generating an air flow along a first flow path within said interior space;
heating said air flow traveling along said first flow path within said interior space;
generating a second flow path of said heated air flow within said interior space, said second flow path substantially parallel to said first flow path;
changing a direction of said heated air flow to a third flow path within said interior space, said third flow path being substantially orthogonal to said second flow path;
expelling said heated air flow traveling along said third flow path from said interior space;
rotating said expelled heated air flow 360° relative to said housing wall absent an external movement of said housing wall; and
evenly heating an area around said housing wall as said expelled heated air flow rotates 360° relative to said housing wall.

31. A portable space heater comprising;
a housing comprising;
a wall defining an interior space;
an air inlet located in a lower portion of said housing;
an air outlet located in an upper portion of said housing;
a base supporting said housing relative to a support surface;
an electric motor disposed within said interior space;
an impeller rotatably disposed within said interior space between said air inlet and said air outlet, said impeller connected to and rotated by said electric motor;
a rotational engine disposed within said interior space;
an air stream deflector rotatably disposed within said interior space between said impeller and said air outlet, said air stream deflector operatively coupled to said rotational engine, said air stream deflector extending at least partially within said upper portion of said housing and toward said air outlet;
an axis of rotation about which said air stream deflector is rotated, said axis of rotation comprising a substantially perpendicular axis of rotation relative to said support surface;
an electric heating element disposed within said interior space between said impeller and said air stream deflector;
a heated air stream exiting said interior space through said air outlet and projected substantially radially outward from said housing;
a flow path of said heated air stream exiting said interior space comprising a substantially parallel flow path relative to said support surface;
wherein said air stream deflector may be rotated using said rotational engine to cause said flow path of said heated air stream to move relative to said base;
intake air entering said first interior space through said air inlet, said intake air induced to enter said interior space by a rotation of said impeller;
an internal intake air stream generated by said rotation of said impeller, said internal intake air stream flowing along a first flow path from said impeller toward said electric heating element, said first flow path being substantially perpendicular to said support surface; and
an internal heated exhaust air stream generated by passing said internal intake air through said electric heating element, said internal heated exhaust air stream flowing along a second flow path from said electric heating element toward said air stream deflector, said second flow path being substantially perpendicular to said support surface;
wherein said second flow path of said internal heated exhaust air stream is substantially orthogonal to said flow path of said heated air stream exiting said interior space.

* * * * *